June 12, 1962   R. O. GOSE   3,038,303
THRUST TERMINATION IN SOLID PROPELLANT ROCKETS
Filed Jan. 2, 1958   2 Sheets-Sheet 1
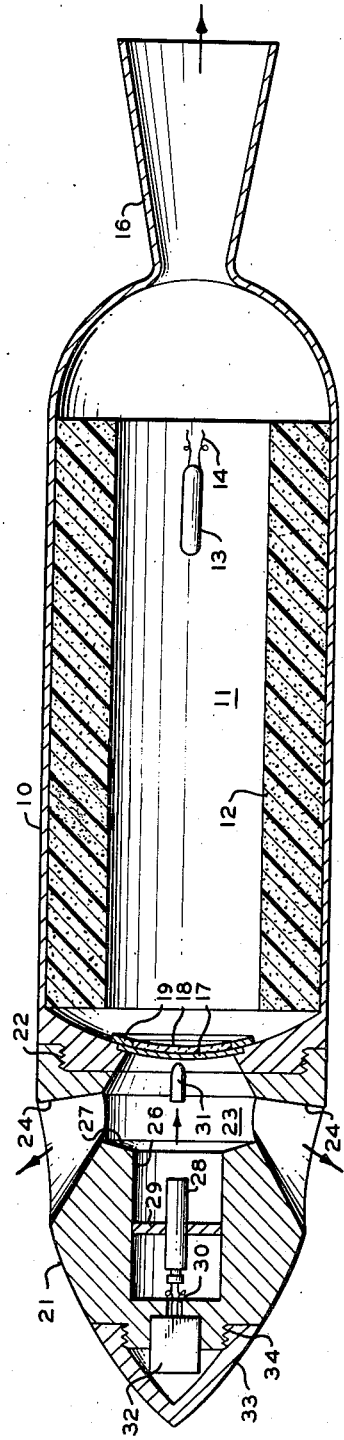
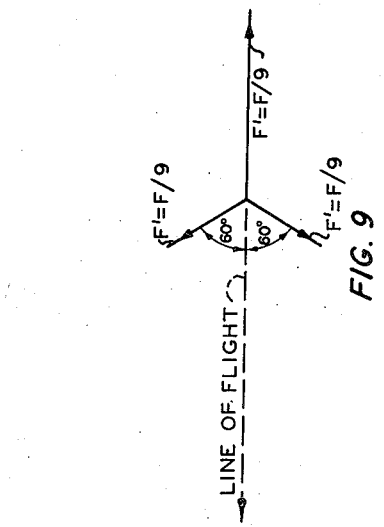
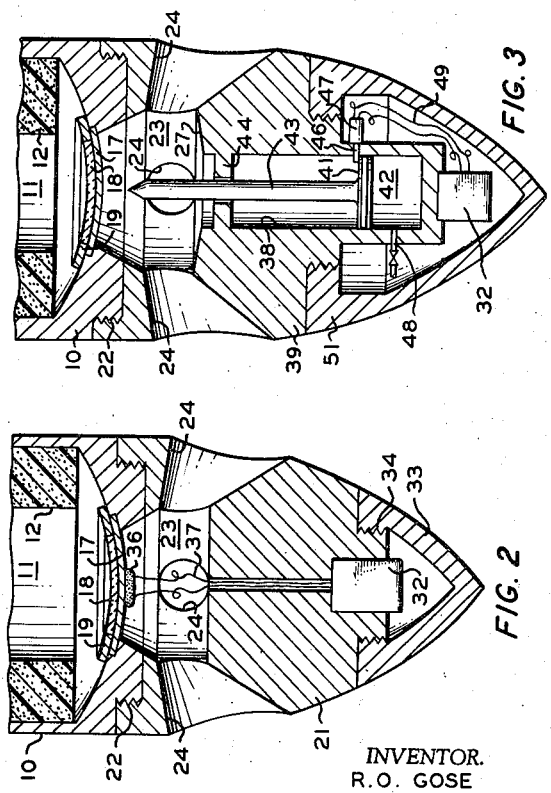
INVENTOR.
R.O. GOSE
BY
ATTORNEYS June 12, 1962  R. O. GOSE  3,038,303
THRUST TERMINATION IN SOLID PROPELLANT ROCKETS
Filed Jan. 2, 1958  2 Sheets-Sheet 2

INVENTOR.
R.O. GOSE

BY
ATTORNEYS

United States Patent Office 3,038,303
Patented June 12, 1962

3,038,303
THRUST TERMINATION IN SOLID PROPELLANT ROCKETS
Robert O. Gose, Rolling Hills, Calif., assignor, by mesne assignments, to the United States of America as represented by the Secretary of the Air Force
Filed Jan. 2, 1958, Ser. No. 706,861
16 Claims. (Cl. 60—35.6)

This invention relates to thrust termination in solid propellant rockets. In one aspect, this invention relates to terminating thrust in a solid propellant rocket by expanding combustion chamber gases through a plenum chamber and then through a plurality of symmetrically arranged auxiliary exhaust nozzles oriented so as to give components of thrust essentially equal and opposite to the reduced thrust of the original exhaust nozzle of the rocket motor.

In order to control the trajectory of a ballistic missile or rocket motor, it is necessary to terminate development of thrust when the desired path and velocity have been established. This is readily and fairly simply accomplished in liquid propellant rockets by terminating the injection of fuel to the combustion chamber. However, the development of guided missiles or rocket motors using solid propellants has been handicapped because of a lack of a practical shutoff technique.

Various means have been proposed in the prior art for terminating thrust in solid propellant rockets. One method includes the use of auxiliary rocket motors adapted to give components of thrust which cancel the thrust of the main rocket motor. It has also been proposed to employ auxiliary nozzles to bleed off combustion chamber gases from the main rocket motor so as to give components of thrust which cancel the thrust of the main rocket motor. In the prior art, these auxiliary nozzles have been covered with individual caps adapted to be opened on an electric signal or by other means. It has been found difficult to control the simultaneity of opening said individual caps on each exhaust nozzle. Unless said auxiliary nozzles are properly aligned and are opened simultaneously, perturbations in the flight of the rocket having pitch, yawl and/or roll components are produced. Said perturbations can be, and frequently are, great enough to override corrections by the guidance system of the missile. Obviously, such perturbations cannot be tolerated if the trajectory of the rocket is to be accurately controlled.

I have found that the above difficulties can be overcome if combustion chamber gases from the main rocket motor are expanded from a single plenum chamber through auxiliary exhaust nozzles employing only one diaphragm or closure member to initiate thrust through all of the said auxiliary nozzles. Thus, broadly speaking, my invention comprises a method and apparatus for terminating thrust in a solid propellant rocket by expanding combustion chamber gases through a plenum chamber and then through a plurality of symmetrically arranged auxiliary nozzles oriented in such a manner as to give components of thrust which are essentially equal to the reduced thrust of the main rocket motor nozzle after expansion of said combustion chamber gases has started.

FIGURE 1 is a diagrammatic representation of a rocket motor illustrating one embodiment of the invention wherein the diaphragm separating the plenum chamber and the combustion chamber is ruptured by firing a bullet into said diaphragm.

FIGURE 2 is a diagrammatic representation of a rocket motor illustrating another modification of the invention wherein an explosive charge is used to rupture the diaphragm separating the plenum chamber and the combustion chamber.

FIGURE 3 is a diagrammatic representation of the nose portion of a rocket motor similar to that illustrated in FIGURE 1, and illustrating an embodiment of the invention wherein a piston driven punch is employed to rupture the diaphragm separating the plenum chamber from the combustion chamber.

FIGURE 9 illustrates a force diagram which is obtained when employing an apparatus such as that illustrated in FIGURE 1.

Figure 8:
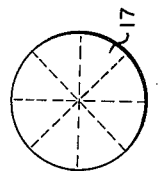
FIGURE 8 illustrates one type of scored diaphragm which can be employed according to the invention.

Referring now to the drawings, the invention will be more fully explained. In FIGURE 1, there is illustrated a rocket motor comprising a case 10 defining in part a combustion chamber 11 having disposed therein a solid propellant charge 12. Said propellant can be any suitable solid propellant. A presently preferred solid propellant comprises an oxidant such as ammonium nitrate uniformly dispersed in a rubbery binder such as a butadiene-methyl vinyl pyridine copolymer. Said propellant charge can be ignited by means of squib 13 connected by means of wires 14 into an electrical circuit (not shown) at the launching platform. A nozzle portion 16, defining a Venturi-like passage for the exhaust of combustion chamber gases, is attached to the after end of said case 10. The forward end of said combustion chamber 11 is closed by a frangible closure member 17 which is protected from the heat generated within the combustion chamber by means of insulation 18. Frangible closure member 17 can be fabricated from any suitable material adapted to withstand the pressures generated within combustion chamber 11 and which can be readily ruptured. As shown in FIGURE 8, said frangible closure member is preferably scored radially so as to cause said member to rupture along the scored lines and "peel back." Since the edges of frangible closure member 17 are held securely in place by means of flange 19, held in place by means of bolts not shown, the segments of the ruptured closure member will be held in place. Any suitable refractory insulation material such as Adachrome cast, a castable refractory solid by Botfield Refractories Co., can be used for insulation material 18.

A nose piece 21 is attached to the forward end of case 10 by means of threads 22 or any other suitable connecting means. Said nose piece is recessed in its after end, and when placed adjacent said closure member 17 forms a plenum chamber 23 adjacent and on the forward side of said closure member. A plurality of symmetrically arranged auxiliary nozzles 24 of equal throat area are provided in said nose piece. Each of said auxiliary nozzles defines a passage from said plenum chamber. Said auxiliary nozzles 24 are oriented with respect to the longitudinal axis of said rocket motor so as to give components of thrust essentially equal and opposite to the reduced thrust of nozzle means 16 when said closure member 17 is ruptured and expansion of combustion chamber gases through said plenum chamber has started.

An axially disposed recess 26 extends from the forward wall 27 of said plenum chamber 23. A coaxially disposed gun 28 is mounted on suitable rods 29 within said recess 26. Said gun 28 is adapted to fire a bullet 31 into frangible closure member 17 and rupture same, responsive to a signal from guidance system 32 positioned in the forward end of said nose piece 21, and thus place combustion chamber 11 into communication with plenum chamber 23 for exhaust of combustion gases through nozzles 24. Access to said guidance system can be obtained by removing cap 33 attached by means of threads 34 to nose piece 21 as shown.

Said guidance means or system 32 can be any suitable type of guidance system known to those skilled in the art. For example, it can be a passive system, often called a Command System, in which the missile carries very little guidance equipment. The radars and computers, i.e., the nervous system, are all on the ground or in a controlling aircraft which follows the missile. Said radars and computers track and identify both the target and the missile by means of radars and/or visual tracking devices, log the courses of each, and issue introductions to the missile itself. In another type, often called the Active Guidance System, almost all the equipment for locating the position of the missile, for computing the corrections, and for terminal guidance are located within the frame of the missile itself. Still another type is called the Semi-Active Guidance System. As is indicated by the name, this system falls in between the first two described and the guidance system is divided between the missile equipment and the launching station equipment.

FIGURE 2 illustrates another means for rupturing frangible closure member 17. Here, an explosive charge 36 is placed against said closure member 17 and is adapted to be exploded by means of a signal or electric current delivered via wires 37 from guidance system 32. Upon exploding, said explosive charge ruptures closure member 17 and places combustion chamber 11 into communication with plenum chamber 23 for exhaust of combustion chamber gases through auxiliary nozzles 24.

In FIGURE 3, an axially disposed cylinder 38 is formed in the forward wall 27 of nose piece 39. Said cylinder 38 is closed at its forward end and opens into plenum chamber 23 at its after end. A piston 41 is slidably disposed in said cylinder 38 and forms an expansion chamber 42 between said piston and the forward end of cylinder 38. A punch 43, supported by guide means 44, is attached to the after side of said piston 41 and extends into said plenum chamber 23 to a position adjacent said closure member 17. A stop pin 46 actuated by solenoid 47, serves to hold said piston 41 in an inoperative position until it is desired to rupture closure member 17. Conduit 48, having a suitable valve therein, provides means for prepressuring said expansion chamber 42 to any desired pressure. Said solenoid 47 is actuated by means of a signal or electric current delivered via wires 49 from guidance system 32. Access to said guidance system and said conduit 48 can be obtained by removing cap 51 which is attached to nose piece 39 by means of the threads shown or any other suitable connecting means.

Figure 4:
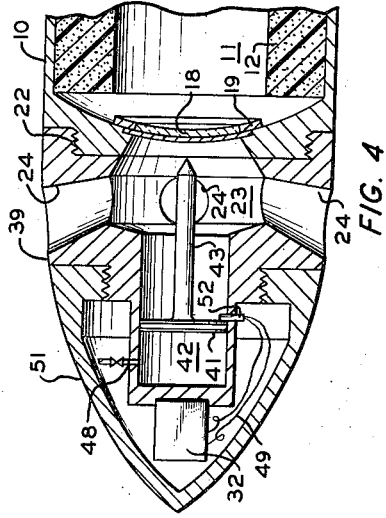
FIGURE 4 is a diagrammatic representation of the forward portion of a rocket motor illustrating another embodiment of the invention wherein a piston driven punch is employed to rupture the diaphragm separating the plenum chamber from the combustion chamber.

The apparatus illustrated in FIGURE 4 is similar to that shown in FIGURE 3 except that stop pin 46 is replaced with stop pin 52 which comprises an explosive bolt adapted to be exploded upon signal or electric current delivered via wires 49 from guidance system 32.

Figure 5:
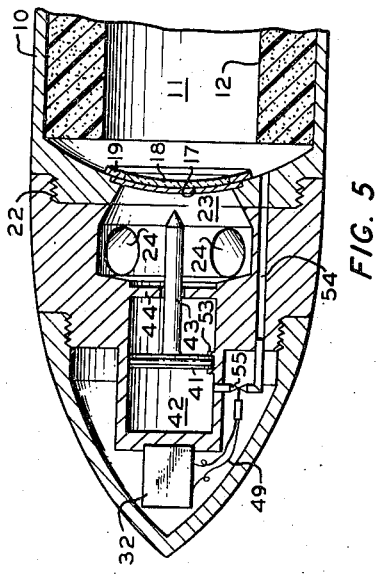
FIGURE 5 is a diagrammatic representation of the forward end of a rocket motor illustrating an embodiment of the invention wherein combustion chamber gases are employed to actuate a piston driven punch which ruptures the diaphragm between the plenum chamber and the combustion chamber.

The apparatus illustrated in FIGURE 5 is also similar to that illustrated in FIGURES 3 and 4 in that a piston driven punch is employed to rupture closure member 17. However, in FIGURE 5, the piston 41 is held in an inoperative position by means of shear pins 53. Shear pins 53 are of a soft metal which is readily sheared off when force is applied to the forward side of piston 41. As shown, a conduit 54 extends between expansion chamber 42 and combustion chamber 11. Said conduit has a solenoid valve 55 therein which can be opened upon receiving a signal or electric current via wires 49 from guidance system 32 to admit combustion chamber gases into expansion chamber 42 and thus drive punch 43 into closure member 17 and rupture same. Although two shear pins 53 have been shown, it usually is not necessary to employ more than one, i.e., the one on the after side of said piston 41.

Figure 6:
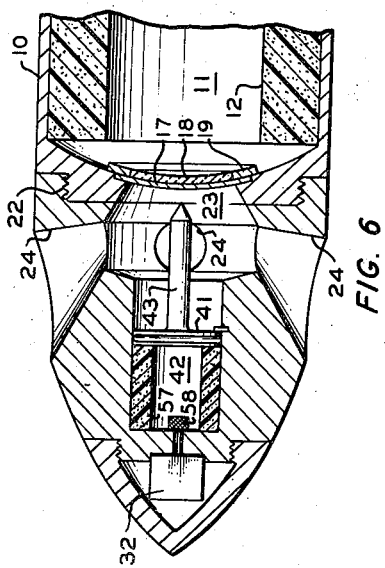
FIGURE 6 is a diagrammatic representation of the forward end of a rocket motor illustrating an embodiment of the invention wherein a gas generating charge is employed to actuate a piston driven punch which ruptures the diaphragm between the plenum chamber and the combustion chamber.

In the apparatus illustrated in FIGURE 6 a piston driven punch 43 is also employed to rupture closure member 17. Expansion chamber 42 has a gas generating charge 57 disposed therein. Said gas generating charge can be any suitable material for the purpose. For example, it can be some of the same propellant employed in combustion chamber 11 if desired. A suitable electric squib 58 is provided for igniting said gas generating charge 57. Said squib 58 ignites upon receiving a signal or electric current from guidance system 32. Said squib or igniting means 58 can be any suitable type of igniting means known to those skilled in the art.

Figure 7:
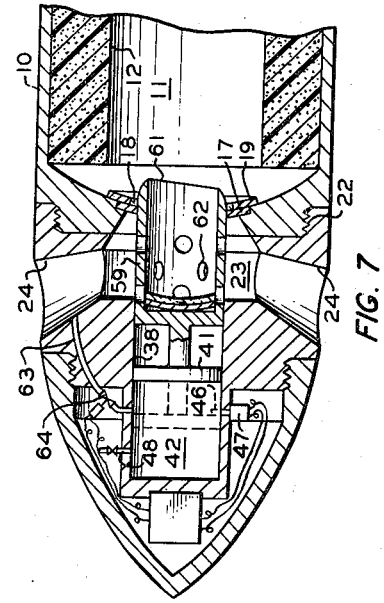
FIGURE 7 is a diagrammatic representation of the forward end of a rocket motor illustrating a modification of the invention wherein a piston driven cylindrical cutter is employed to remove a circle from the diaphragm separating the plenum chamber and the combustion chamber.

In the apparatus shown in FIGURE 7, a cylindrical cutter 59, having a hardened cutting edge 61 on the forward end thereof, is employed to rupture closure member 17. As indicated, said cutter member cuts out a circular portion of said closure member 17 and the pressure of the combustion gases from combustion chamber 11 forces said circular portion into the after end of said cutter member. Perforations 62 are provided in the wall of said cutter member for the passage of combustion chamber gases into plenum chamber 23. Said cutter member 59 is driven by means of piston 41, slidably engaged in cylinder 38, similarly as in the previously described apparatus. A solenoid actuated stop pin 46 retains piston 41 in a non-operative position until it is desired to rupture closure member 17, similarly as in the apparatus of FIGURE 3. Conduit 48, having a suitable valve therein, provides means for prepressuring expansion chamber 42 to any desired pressure. As here shown, cutter member 59 has just penetrated closure member 17. In operation, the pressure of the combustion chamber gases will force said cutter member 59 into a retracted position similar to that of its original inoperative position as indicated by the dotted lines. Conduit 63, having solenoid valve 64 therein, is provided for bleeding off pressure from expansion chamber 42 after cutter 59 has penetrated closure member 17.

In the operation of the apparatus illustrated in FIGURE 1, the rocket motor is mounted upon a suitable launching platform and the propellant charge 12 in combustion chamber 11 is ignited by means of igniter 13 whereupon the rocket is launched. At a particular desired time a signal or electric current is delivered from guidance system 32 via wires 30 to gun 28 which then fires bullet 31 into frangible closure member 17, rupturing same, and placing combustion chamber 11 into communication with plenum chamber 23. Combustion chamber gases pass through plenum chamber 23 and out auxiliary exhaust nozzles 24 to the outside atmosphere. Since said exhaust nozzles 24 are symmetrically arranged, and are oriented so as to give components of thrust which are essentially equal to the reduced thrust generated by nozzle means 16 after rupture of closure member 17, the thrust of the rocket motor in a forward direction is terminated.

The effect of opening up new apertures, such as auxiliary nozzles 24, on the combustion chamber pressure, and hence on the individual thrust vectors is shown by the following example. Consider a solid propellant with the simple burning-rate law:

$$r = a p_c^n$$

where $r$ is the burning rate, $p_c$ is the combustion chamber pressure, $a$ is a constant, and $n$ is the exponent appropriate to the particular propellant being used. Take, for example, $n=0.5$. Add a single pair of symmetrical nozzles tilted 120° from the main thrust axis, each with throat areas $f_t$ nearly equal to the main nozzle throat area.

It is known in the art of solid-propellant rockets that, for the burning-rate law just stated, combustion chamber pressure $p_c$ depends on the throat area $f_t$ and the burning-rate exponent $n$ in the following manner:

$$p_c = (\text{constant})\ (f_t)^{\frac{1}{n-1}}$$

Thus, if two additional identical nozzles are opened so that $f_t' \to 3\ f_t$, the combustion chamber pressure for the $n=0.5$ case will drop from $p_c$ to $p_c'$ in the following ratio:

$$\frac{p'_c}{p_c} = \frac{f'_t}{f_t}^{\frac{1}{n-1}} = (3)^{\frac{1}{0.5-1}} = \frac{1}{9}$$

and the thrust $F'$ exerted by each nozzle will drop to $F/9$ where $F$ is the initial axial thrust. The force diagram would be shown in the sketch in FIGURE 9. Thus, the net force acting on the rocket would become nearly zero at the instant when the diaphragm is ruptured.

It is believed that the operation of the apparatus illustrated in FIGURES 2, 3, 4, 5 and 6 will be obvious from the description of said figures in view of the operation described for FIGURE 1.

In FIGURE 7, solenoid 47 withdraws stop pin 46 permitting piston 41 to drive cutter member 59 into closure members 17. After cutter member 59 has penetrated closure member 17, another signal from guidance means 32 actuates solenoid valve 64 to bleed off the pressure in expansion chamber 42 and permit piston 41 to be retracted by the force of combustion chamber gases upon cutter 59.

While the invention has been illustrated by describing several different embodiments thereof, it is not necessarily limited to the particular embodiments described. Various other modifications will be apparent to those skilled in the art in view of the above disclosure. Such modifications are believed to be within the spirit and scope of the invention.

I claim:

1. A rocket motor, provided with means for terminating thrust while in flight, comprising: a case defining a combustion chamber having its forward end closed with a frangible closure member; a first normally open exhaust nozzle means disposed in the after end of said case; a nose piece attached to the forward end of said case and forming a single plenum chamber on the forward side of and adjacent said closure member; a plurality of symmetrically arranged exhaust passages formed in said nose piece, each in communication with said plenum chamber to provide unobstructed passageways from said single plenum chamber, and oriented so as to give components of thrust essentially equal and opposite to the reduced thrust of said first exhaust nozzle when said closure member is ruptured; and means disposed in said nose piece and adjacent said closure member for rupturing said closure member so as to place said combustion chamber into communication simultaneously with all of said exhaust passages via said single plenum chamber.

2. A rocket motor according to claim 1 wherein said means for rupturing said closure member comprises means mounted in said nose piece for hurling a projectile against said closure member.

3. A rocket motor according to claim 1 wherein said means for rupturing said closure member comprises: an explosive charge attached to the forward side of said closure member; and means mounted in said nose piece and connected to said explosive charge for exploding said explosive charge so as to rupture said closure member.

4. A rocket motor according to claim 1 wherein said means for rupturing said closure member comprises a punch mounted in said nose piece, and means also mounted in said nose piece for driving said punch into said closure member.

5. A rocket motor according to claim 1 wherein said means for rupturing said closure member comprises a cylindrical cutter member mounted in said nose piece, and means also mounted in said nose piece for driving said cutter member into said closure member.

6. A rocket motor according to claim 1 wherein said frangible closure member is scored radially.

7. A rocket motor according to claim 2 wherein said means for hurling a projectile comprises: a gun coaxially mounted in an axially disposed recess extending into said nose piece from the forward wall of said plenum chamber, said gun being adapted to fire a bullet into said closure member, and means for causing said gun to fire said bullet.

8. A rocket motor according to claim 2 wherein said frangible closure member is scored radially.

9. A rocket motor according to claim 4 wherein said means for rupturing said closure member comprises: a cylinder formed in said nose piece, closed at its forward end and opening into said plenum chamber at its after end; a piston slidably mounted in said cylinder and forming an expansion chamber between the forward end of said cylinder and said piston; a punch attached to said piston and extending into said plenum chamber; a stop-pin extending into said cylinder and adapted to hold said piston in an inoperative position; conduit means communicating with said chamber for prepressuring said expansion chamber; a solenoid attached to said stop-pin; and means for actuating said solenoid so as to withdraw said stop-pin and cause said punch to be driven into said closure member responsive to said pressure in said prepressured expansion chamber.

10. A rocket motor, provided with means for terminating thrust while in flight, comprising: a case defining a combustion chamber; a solid propellant charge within said combustion chamber; means for igniting said propellant charge; a normally open first nozzle defining a Venturi-like passage disposed in the after end of said case; a frangible closure member closing the forward end of said combustion chamber; a nose-piece attached to the forward end of said case and forming a single plenum chamber adjacent and on the forward side of said closure member; a plurality of symmetrically arranged auxiliary nozzles of equal throat area in said nose piece, each defining an unobstructed passage from said single plenum chamber, and oriented with respect to the longitudinal axis of said rocket motor so as to give components of thrust essentially equal and opposite to the reduced thrust of said first nozzle; and means disposed in said nose piece and adjacent said closure member for rupturing said closure member so as to place said combustion chamber into communication simultaneously with all of said exhaust passages via said single plenum chamber.

11. A rocket motor, provided with means for terminating thrust while in flight, comprising: a case defining a combustion chamber having its forward end closed with a frangible closure member; a first exhaust nozzle means disposed in the after end of said case; a nose piece attached to the forward end of said case and forming a plenum chamber on the forward side of and adjacent said closure member; a plurality of symmetrically arranged exhaust passages formed in said nose piece, each in communication with said plenum chamber, and oriented so as to give components of thrust essentially equal and opposite to the reduced thrust of said first exhaust nozzle when said closure member is ruptured; a cylinder formed in said nose piece, closed at its forward end and opening into said plenum chamber at its after end; a piston slidably mounted in said cylinder and forming an expansion chamber between the forward end of said cylinder and said piston; a punch attached to said piston and extending into said plenum chamber; an explosive stop-pin extending into said cylinder and adapted to hold said piston in an inoperative position; conduit means communicating with said chamber for prepressuring said expansion chamber; and means for exploding said explosive stop-pin so as to remove same and cause said punch to be driven into said closure member responsive to said pressure in said prepressured expansion chamber, rupture said closure member and thus place said combustion chamber into communication simultaneously with all of said exhaust passages via said plenum chamber.

12. A rocket motor, provided with means for terminating thrust while in flight, comprising: a case defining a combustion chamber having its forward end closed with a frangible closure member; a first exhaust nozzle means disposed in the after end of said case; a nose piece attached to the forward end of said case and forming a plenum chamber on the forward side of and adjacent said closure member; a plurality of symmetrically arranged exhaust passages formed in said nose piece, each in communication with said plenum chamber, and oriented so as to give components of thrust essentially equal and opposite to the reduced thrust of said first exhaust nozzle when said closure member is ruptured; a cylinder formed in said nose piece, closed at its forward end and opening into said plenum chamber at its after end; a piston slidably mounted in said cylinder and forming an expansion chamber between the forward end of said cylinder and said piston; a punch attached to said piston and extending into said plenum chamber; a shear pin extending into said cylinder and adapted to hold said piston in an inoperative position; conduit means, having a solenoid valve therein, extending between said expansion chamber and said combustion chamber; and means for actuating said solenoid valve so as to admit pressure to said expansion chamber and cause said piston to drive said punch into said closure member, rupture said closure member and thus place said combustion chamber into communication simultaneously with all of said exhaust passages via said plenum chamber.

13. A rocket motor, provided with means for terminating thrust while in flight, comprising: a case defining a combustion chamber having its forward end closed with a frangible closure member; a first exhaust nozzle means disposed in the after end of said case; a nose piece attached to the forward end of said case and forming a plenum chamber on the forward side of and adjacent said closure member; a plurality of symmetrically arranged exhaust passages formed in said nose piece, each in communication with said plenum chamber, and oriented so as to give components of thrust essentially equal and opposite to the reduced thrust of said first exhaust nozzle when said closure member is ruptured; a cylinder formed in said nose piece, closed at its forward end and opening into said plenum chamber at its after end; a piston slidably mounted in said cylinder and forming an expansion chamber between the forward end of said cylinder and said piston; a punch attached to said piston and extending into said plenum chamber; a shear pin extending into said cylinder and adapted to hold said piston in an inoperative position; a gas generating charge disposed in said expansion chamber; and means for igniting said gas generating charge so as to generate gas and drive said punch into said closure member, rupture said closure member and thus place said combustion chamber into communication simultaneously with all of said exhaust passages via said plenum chamber.

14. A rocket motor, provided with means for terminating thrust while in flight, comprising: a case defining a combustion chamber having its forward end closed with a frangible closure member; a first exhaust nozzle means disposed in the after end of said case; a nose piece attached to the forward end of said case and forming a plenum chamber on the forward side of and adjacent said closure member; a plurality of symmetrically arranged exhaust passages formed in said nose piece, each in communication with said plenum chamber, and oriented so as to give components of thrust essentially equal and opposite to the reduced thrust of said first exhaust nozzle when said closure member is ruptured; a cylinder formed in said nose piece, closed at its forward end and opening into said plenum chamber at its after end; a piston slidably mounted in said cylinder and forming an expansion chamber between the forward end of said cylinder and said piston; a cylindrical cutter attached to said piston and extending into said plenum chamber; a stop-pin extending into said cylinder and adapted to hold said piston in an inoperative position; conduit means communicating with said expansion chamber for prepressuring said expansion chamber; a solenoid attached to said stop-pin; a second conduit means, having a solenoid valve therein, extending from said expansion chamber to one of said exhaust passages; and means for actuating said solenoid attached to said stop-pin so as to withdraw said stop-pin and cause said cylindrical cutter to be driven into said closure member responsive to said pressure in said prepressured expansion chamber, rupture said closure member and thus place said combustion chamber into communication simultaneously with all of said exhaust passages via said plenum chamber.

15. A rocket motor, provided with means for terminating thrust while in flight, comprising: a case defining a combustion chamber having its forward end closed with a frangible closure member; a first exhaust nozzle means disposed in the after end of said case; a nose piece attached to the forward end of said case and forming a plenum chamber on the forward side of and adjacent said closure member; a plurality of symmetrically arranged exhaust passages formed in said nose piece, each in communication with said plenum chamber, and oriented so as to give components of thrust essentially equal and opposite to the reduced thrust of said first exhaust nozzle when said closure member is ruptured; a cylinder formed in said nose piece, closed at its forward end and opening into said plenum chamber at its after end; a piston slidably mounted in said cylinder and forming an expansion chamber between the forward end of said cylinder and said piston; a cylindrical cutter attached to said piston and extending into said plenum chamber; a stop-pin extending into said cylinder and adapted to hold said piston in an inoperative position; first conduit means communicating with said expansion chamber for prepressuring said expansion chamber; a solenoid attached to said stop-pin; a second conduit means, having a solenoid valve therein, extending from said expansion chamber to one of said exhaust passages; means for actuating said solenoid attached to said stop-pin so as to withdraw said stop-pin and cause said cylindrical cutter to be driven into said closure member responsive to said pressure in said prepressured expansion chamber, rupture said closure member and thus place said combustion chamber into communication simultaneously with all of said exhaust passages via said plenum chamber; and means for actuating said solenoid valve to open position after said cutter has cut said closure member so as to exhaust said expansion chamber and permit said cutter to be retracted.

16. A rocket motor, provided with means for terminating thrust while in flight, comprising: a case defining a combustion chamber; a normally open first exhaust nozzle means disposed in the after end of said case; a frangible closure member closing the forward end of said combustion chamber; a nose piece, having an internal recess in its after end portion, attached to the forward end of said case adjacent said closure member, said recess forming a single plenum chamber on the forward side of and adjacent said closure member; a plurality of symmetrically arranged exhaust passages formed in the side walls of said nose piece and each extending from said single plenum chamber through said side walls to provide unobstructed passageways from said single plenum chamber, said exhaust passages being oriented so as to give components of thrust essentially equal and opposite to the reduced thrust of said first exhaust nozzle when said closure member is ruptured; and means disposed in said nose piece and adjacent said closure member for rupturing said closure member so as to place said combustion chamber into communication simultaneously with all of said exhaust passages via said single plenum chamber.

References Cited in the file of this patent

UNITED STATES PATENTS

| | | |
|---|---|---|
| 1,201,763 | Rimailho | Oct. 17, 1916 |
| 2,478,958 | Wheeler et al. | Aug. 16, 1949 |
| 2,489,953 | Burney | Nov. 29, 1949 |
| 2,613,497 | | |
| 2,627,160 | | |
| 2,775,201 | | |
| 2,781,633 | | |
| 2,842,937 | | |
| 2,850,976 | | |
| 2,856,851 | | |
| | MacDonald | Oct. 14, 1952 |
| | MacDonald | Feb. 3, 1953 |
| | Conway | Dec. 25, 1956 |
| | Rogers et al. | Feb. 19, 1957 |
| | Clark | July 15, 1958 |
| | Seifert | Sept. 9, 1958 |
| | Thomas | Oct. 21, 1958 |

FOREIGN PATENTS

| | | |
|---|---|---|
| 498,378 | France | Oct. 17, 1919 |
| 943,263 | France | Oct. 4, 1948 |